(12) United States Patent
McLaughlin et al.

(10) Patent No.: US 8,428,665 B1
(45) Date of Patent: Apr. 23, 2013

(54) HOLDER FOR PORTABLE COMMUNICATION DEVICE

(75) Inventors: Hugh Joseph McLaughlin, Mountain View, CA (US); Paul Michael McLaughlin, Mountain View, CA (US); Caleb Henry Crome, San Jose, CA (US); Robert Kung-ning Yu, Mountain View, CA (US)

(73) Assignee: Signal Essence, LLC, Mountain View, CA (US)

( * ) Notice: Subject to any disclaimer, the term of this patent is extended or adjusted under 35 U.S.C. 154(b) by 0 days.

(21) Appl. No.: 13/560,693

(22) Filed: Jul. 27, 2012

(51) Int. Cl.
*H04B 1/38* (2006.01)

(52) U.S. Cl.
USPC .............. 455/575.1; 455/569.1; 455/575.6; 455/221; 455/128; 455/90.3; 455/556.1; 455/557

(58) Field of Classification Search .............. 455/569.1, 455/575.6, 575.1, 221, 128, 90.3, 556.1, 455/557
See application file for complete search history.

(56) References Cited

U.S. PATENT DOCUMENTS

| | | | |
|---|---|---|---|
| 7,016,708 B1 * | 3/2006 | Chan et al. ................ | 455/569.1 |
| 7,778,431 B2 | 8/2010 | Feng et al. | |
| 2002/0009195 A1 | 1/2002 | Schon | |
| 2002/0052216 A1 * | 5/2002 | Song ............................ | 455/550 |
| 2003/2004533 | 3/2003 | Lopez | |
| 2006/0068722 A1 * | 3/2006 | Ashman, Jr. ................ | 455/90.3 |
| 2007/0135180 A1 * | 6/2007 | Eaton ......................... | 455/575.1 |
| 2007/0287516 A1 * | 12/2007 | Cheung et al. ............. | 455/575.6 |
| 2009/0069060 A1 * | 3/2009 | Kim .......................... | 455/575.6 |
| 2009/0156249 A1 * | 6/2009 | Ruckart ..................... | 455/550.1 |
| 2009/0284482 A1 * | 11/2009 | Chin ............................. | 345/173 |
| 2010/0183179 A1 | 7/2010 | Griffin et al. | |
| 2011/0132950 A1 | 6/2011 | Culver | |

FOREIGN PATENT DOCUMENTS

SG 177812 A1 2/2012

* cited by examiner

*Primary Examiner* — Kwasi Karikari
(74) *Attorney, Agent, or Firm* — Fountainhead Law Group P.C.

(57) ABSTRACT

A holder for a mobile phone includes a body having an opening to receive the mobile phone and having a bottom. The holder further includes a latch coupled to the body for holding the holder with the opening up; and an acoustic horn coupled to the body and having a sound receiving end and a sound emitting end. The sound receiving end is configured to be adjacent to a transducer of the mobile phone, and the sound emitting end is configured to direct sound in an upward direction. The holder further includes a set of tactile guides to tactilely guide a user's touch to a set of buttons on the mobile phone so that a user does not need to look at the buttons to activate the buttons.

21 Claims, 9 Drawing Sheets

HOLDER FOR PORTABLE COMMUNICATION DEVICE

BACKGROUND

Embodiments of the present disclosure generally relate to portable communication devices, and more particularly relate to a holder for holding a portable communication device for ease of use of the portable communication device.

Mobile phones, such as smartphones, are ubiquitously used in a variety of environments for communication. Numerous environments in which mobile phones are used require essentially hands free operation of the mobile phones for safe use. One environment in which hands free use of mobile phones is increasing is the automobile environment in which a driver of an automobile may be required to operate the automobile with essentially minimal handling of the mobile phone while driving. Numerous governments have legislation requiring hands free use of mobile phones while driving automobiles, and drivers have generally become aware that essentially hands free use of mobile phones while driving improves safe driving.

Various devices provide a limited solution for hands free use of mobile phones while driving. Some of the devices that provide for hands free use of mobiles phones while driving include: i) wired headsets that include microphones and relatively small speakers (e.g., transducers) that fit into or onto a user's ear; ii) wireless headsets, such as Bluetooth devices; iii) a hands-free wireless speakerphone, such as a Bluetooth device that mounts either on the dashboard or the sun visor; iv) a hands-free factory-installed Bluetooth speakerphone device; and v) a hands-free kit designed to dock a mobile phone where the hands-free kit provides a relatively large speaker and a directional microphone.

Each of these devices has specific limitations in providing its intended function. For example, wired headsets are cumbersome to handle. A wired headset includes a headset plug that needs to be plugged into a jack of a mobile phone, and includes an earpiece that needs to be positioned onto a user's ear. Wireless headsets similarly include an earpiece that needs to be positioned onto a user's ear, and have to be charged for use. Trying to put an ear piece onto one's ear while driving and trying to answer a call is difficult for many people and can therefore be very distracting. Further, making sure a wireless headset is charged for use is difficult for many users. Speakerphone devices often have microphone sensors that are placed relatively far (e.g., 30 centimeters or more) from a user's mouth. Considering an automobile's noisy environment, there is typically a relatively large amount of noise that is picked up by the microphones of mobile phones. Moreover, with a mobile phone docked in a relatively open space in an automobile, such as on a dash board, sound reaching a microphone of a mobile phone may be distorted from reflections inside the automobile.

Also, sound emitted from a mobile phone in a relatively open space of an automobile may be attenuated from being distorted from multiple reflections inside the automobile making the sound difficult to understand. More specifically, a known problem with mobile phones is that the loudspeakers are generally weak. The space available in a mobile phone for a loudspeaker's transducer is relatively small so the loudspeaker's transducer is neither powerful nor efficient. In an automobile, the sound output of typical mobile phones is relatively weak compared to the background noise.

Some devices have been developed for focusing and aiming sound emitted from a mobile phone so that the sounds are perceived as being played louder. Some devices for playing "louder" sounds from a mobile phone have an acoustic horn where the acoustic horn focuses and aims the sound at a listener thereby limiting dispersion and distortion of the sound before the sound reaches the listener. Acoustic horns are well known devices that have been used since the invention of the phonograph for playing sounds louder. An acoustic horn plays a sound louder by improving the impedance mismatch between a sound source, such as a transducer, and the air. Since the loudspeaker of a mobile phone has a small diaphragm, a relatively good acoustic impedance match is achieved by attaching an acoustic horn to a port of the mobile phone's loudspeaker. The result of attaching an acoustic horn to a loudspeaker in generally improved acoustic efficiency with a small horn "amplifying" high frequencies and a large horn "amplifying" low frequencies. U.S. patent application Ser. No. 09/951,561, of Schon, describes a mobile phone holder that includes a forward-directed acoustic horn to enhance the sound emitted from a loudspeaker port of a mobile phone. The forward-directed acoustic horn of Schon primarily directs sound forward from Schon's mobile phone holder, which provides beneficial sound direction for a listener positioned with Schon's mobile phone holder facing the listener.

Additional problems exists with using mobile phones while driving, such as diverting one's eyes to the mobile phone to operate the mobile phone's buttons. Many mobile phones, such as smart phones, have very few hard buttons that a user may use for tactilely guiding the user's fingers to the hard buttons without having to look at the hard button. A hard button is a traditional button, such as a mechanical button, an electromechanical button, or the like. In contrast, many mobile phones only have soft buttons that do not provide any tactile guidance for locating the soft buttons and generally requiring being looked at to locate the soft buttons symbol. A soft button is a button displayed on a touch screen and may be activated by touch. One example of a soft button is a mute control soft button that may be displayed on the touch screen of a smartphone where the mute control soft button may be touched by a user to mute the microphone of the smartphone.

Therefore, an impetus exists for creating new devices for mobile phone use in automobiles where the new devices aid users in hands-free operation of mobile phones, provide for relatively clear sound emission, and provide for relatively undistorted sound detection of a user's speech.

SUMMARY

Embodiments of the present disclosure generally relate to portable communication devices, and in particular relates to a holder for holding a portable communication device for simplification of use of the portable communication device.

According to one embodiment, a holder for a mobile phone includes a body having an opening to receive the mobile phone by sliding the mobile phone into the body and having a bottom. The holder further includes a latch coupled to the body for holding the holder with the opening up. The holder further includes an acoustic horn coupled to the body and having a sound receiving end and a sound emitting end. The sound receiving end is configured to be aligned with a transducer of the mobile phone, and the sound emitting end is configured to direct sound in an upward direction. The transducer may be a loud speaker.

According to a specific embodiment, the sound emitting end is configured to direct sound up toward a user's head with the latch holding the opening up.

According to another specific embodiment, the latch is configured to latch the holder to an automobile seatbelt to hold the opening up and the sound emitting end up.

According to another specific embodiment, the latch is configured to latch the holder to a garment of a user to hold the holder with the opening up and the sound emitting end up.

According to another specific embodiment, the latch is configured to latch the holder at a user's chest or torso, and the acoustic horn is configured to direct sound toward a user's head.

According to another specific embodiment, a bottom of the body has an aperture formed therein for receiving sound from the transducer of the mobile phone and directing the sound to the acoustic horn for transmission from the acoustic horn.

According to another specific embodiment, the holder further includes a gasket coupled to the bottom of the body, wherein the gasket has a central opening at the aperture to allow sound from the transducer to pass to the acoustic horn and inhibit sound passing through a material that forms the gasket.

According to another specific embodiment, the bottom of the body has a second aperture formed therein, the second aperture is configured to be adjacent to a microphone of the mobile phone, and gasket is configured to inhibit sound from traveling from the transducer of the mobile phone to the microphone of the mobile phone.

According to another specific embodiment, the body includes a set of tactile guides to tactilely guide a user's touch to a set of buttons on the mobile phone.

According to another specific embodiment, the set of tactile guides includes a first tactile guide adjacent to an unlock button soft button included in the set of buttons, and the set of tactile guides includes a second tactile guide adjacent to a speaker phone button included in the set of buttons.

According to another specific embodiment, the first and the second tactile guides are recesses formed in the body.

According to another specific embodiment, the set of tactile guides includes a third tactile guide adjacent to a mute soft button of the mobile phone.

According to another specific embodiment, the third tactile guide is a protrusion extending from the body.

According to another embodiment, a holder for a mobile phone includes a body forming an opening, and having a bottom forming a bottom of the opening. The opening is configured to receive and hold the mobile phone in the opening. The body includes a set of tactile guides to tactilely guide a user's touch to a set of buttons on the mobile phone. The holder further includes a latch coupled to the body for holding the holder with the opening up.

According to a specific embodiment, the set of tactile guides includes a first tactile guide adjacent to an unlock button soft button included in the set of buttons, and the set of tactile guides includes a second tactile guide adjacent to a speaker phone button included in the set of buttons.

According to another specific embodiment, the first and the second tactile guides are recesses formed in the body.

According to another specific embodiment, the set of tactile guides includes a third tactile guide adjacent to a mute button of the mobile phone.

According to another specific embodiment, the third tactile guide is a protrusion extending from the body.

According to another specific embodiment, the holder further includes an acoustic horn coupled to the body and having a sound receiving end and a sound emitting end, wherein the sound receiving end is configured to be adjacent to a transducer of the mobile phone, and the sound emitting end is configured to direct sound upward.

The following detailed description and accompanying drawings provide a better understanding of the nature and advantages of the present disclosure.

DETAILED DESCRIPTION

Figure 1A:
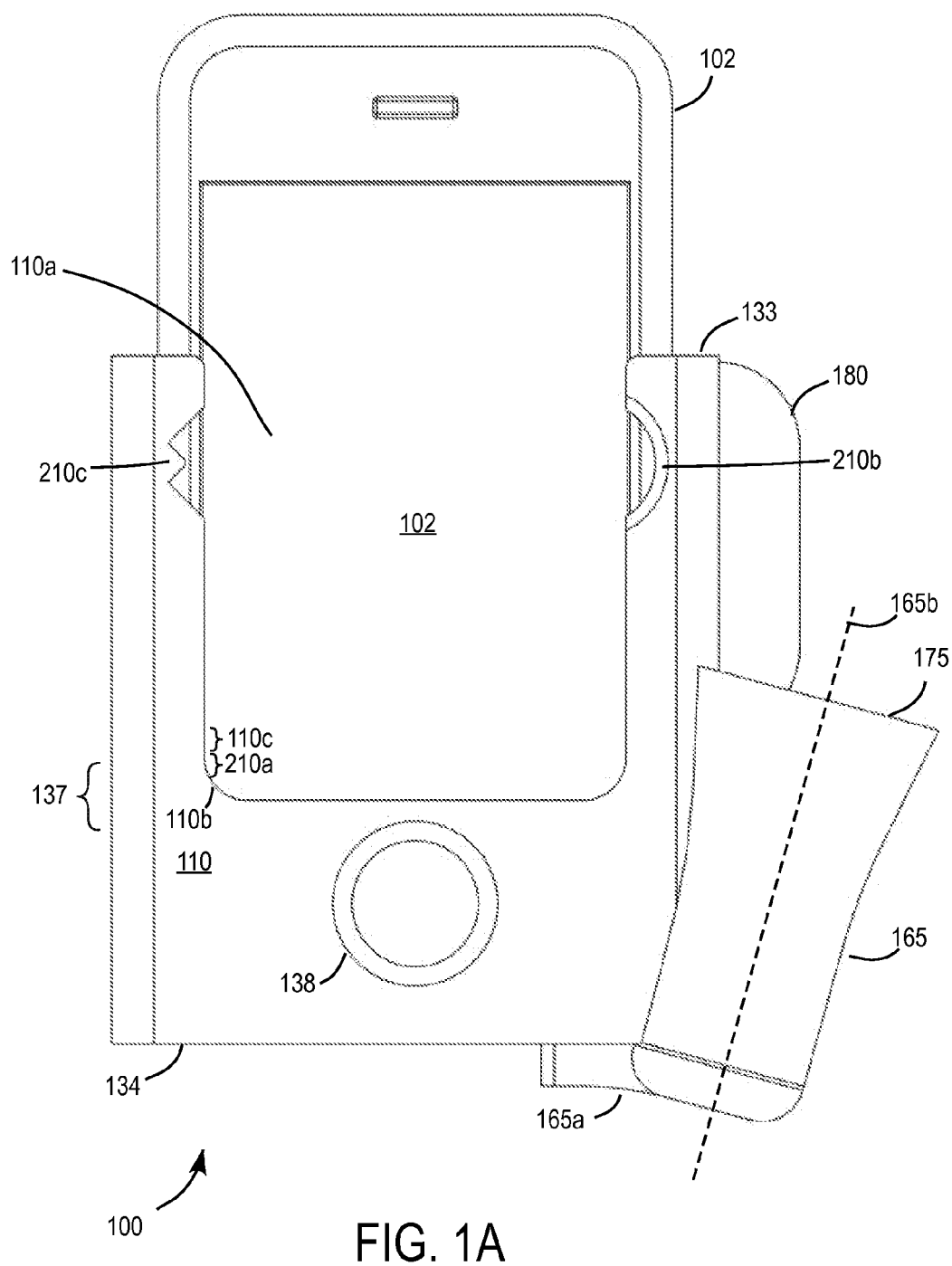
FIG. 1A is a simplified front view of a holder according to one embodiment.

Embodiments of the present disclosure generally provide a holder for a portable communication device, and in particular provides a holder configured to hold a portable communication device relatively close to a user's body for relatively simple ergonomic use and relatively improved sound quality.

In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Mobile phones often have two microphones for detecting sound, such as a user's speech. A first microphone is often near a bottom of a mobile phone, and a second microphone is often near a top of the mobile phone. The first microphone at the bottom of the mobile phone may be used for detecting a user's voice with the mobile phone held near, or against, a side of a user's head ("normal" use position) with the first microphone proximate to the user's mouth. The first microphone may also be used for "hands-free" talking where the mobile phone is not in the normal use position but is positioned away from a user's head. The first and the second microphones are often coordinated by the mobile phone's signal processor to reduce undesired noise detected by the microphones from being transmitted from the mobile phone in a mobile phone call.

Mobile phones also often include two transducers for producing sound. A first transducer is often near the top-front of a mobile phone and a second transducer is often on the back or bottom of the mobile phone. The first transducer is typically configured for use near a user's ear with the mobile phone near, or against, a person's head. The second transducer may be a loudspeaker that produces louder sounds than the first transducer and may be for speakerphone use. The two transducers are typically distant from the microphones to minimize problems with echo coming into the microphones. Generally, for a mobile phone to operate well, the mobile phone and the mobile phone's microphones may be configured to minimize echo and the distortion of sound entering the microphones. Various embodiments of the present disclosure are configured to limit echo and the distortion of sound entering the microphones.

FIGS. 1A, 1B, 1C, 1D, 1E, and 1F are simplified schematics of a holder 100 configured to hold a mobile phone 102 according to one embodiment. Holder 100 may be attached to a seatbelt, or the like, of an automobile to hold mobile phone 102 while a user operates the automobile. For example, holder 100 may be attached to an over-the-shoulder seat belt that comes across a driver's chest. Holder 100 may alternatively be attached to part of a user's garment, such as a lapel, a placket, a shirt pocket, etc. Holder 100 may hold mobile phone 102 relatively close to a user's body. Advantages of holding mobile phone 102 relatively close to a user's body are described in detail below.

Figure 1B:
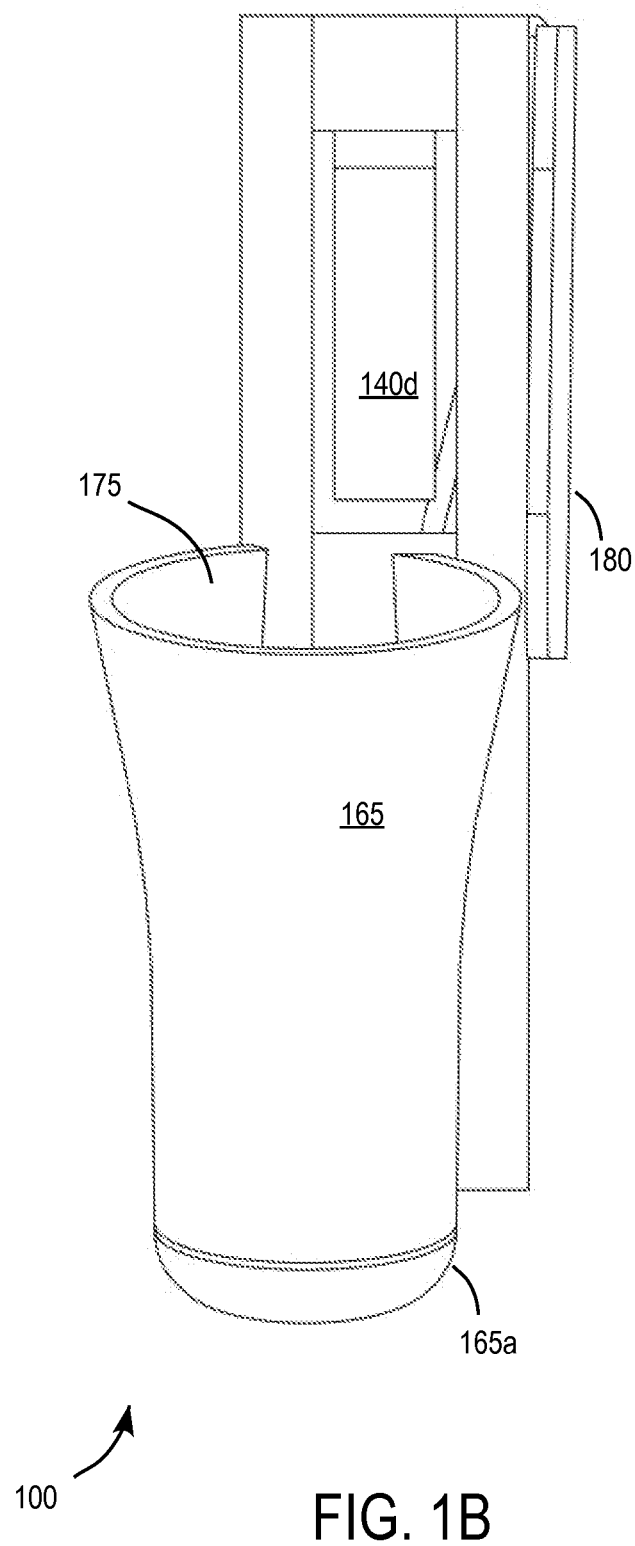
FIG. 1B is a simplified right-side view of the holder according to one embodiment.
Figure 1C:
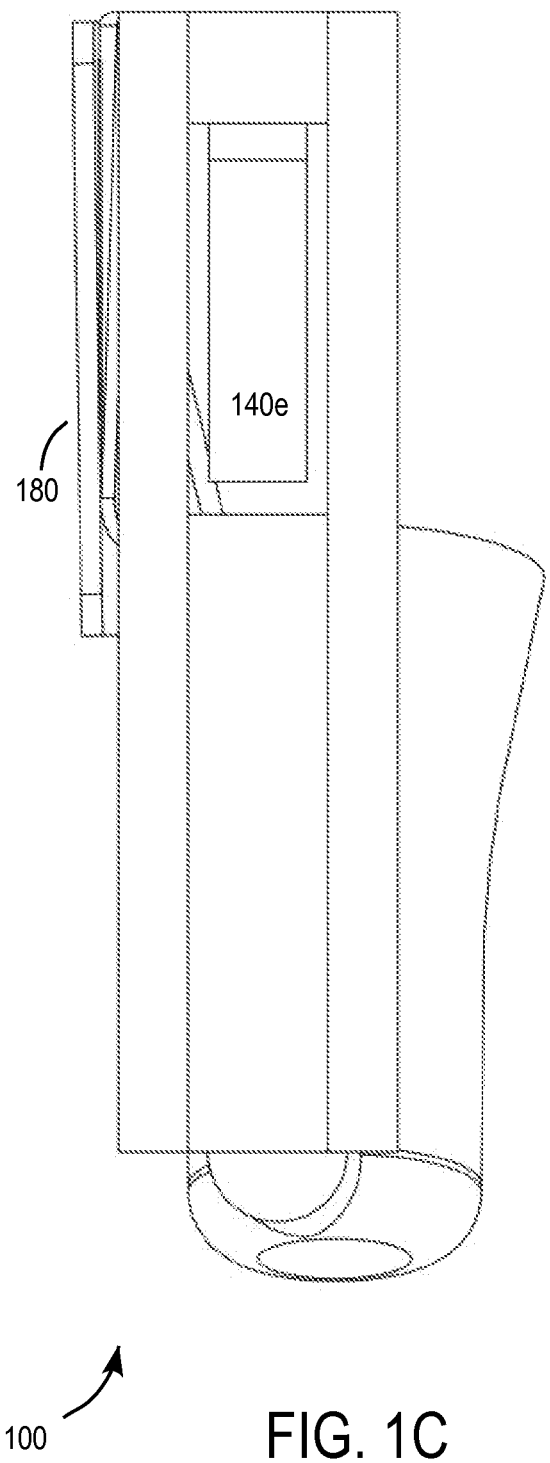
FIG. 1C is a simplified left-side view of the holder according to one embodiment.
Figure 1D:
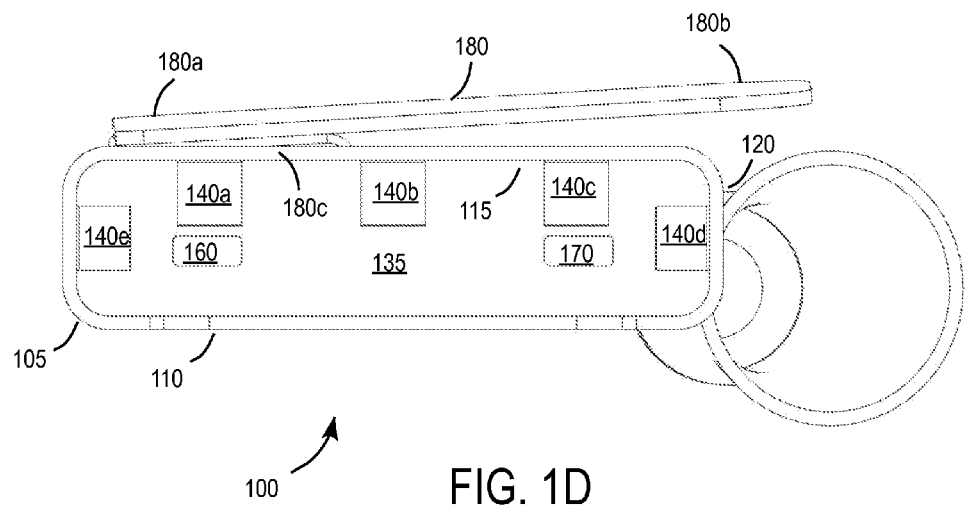
FIG. 1D is a simplified top view of the holder according to one embodiment.
Figure 1E:
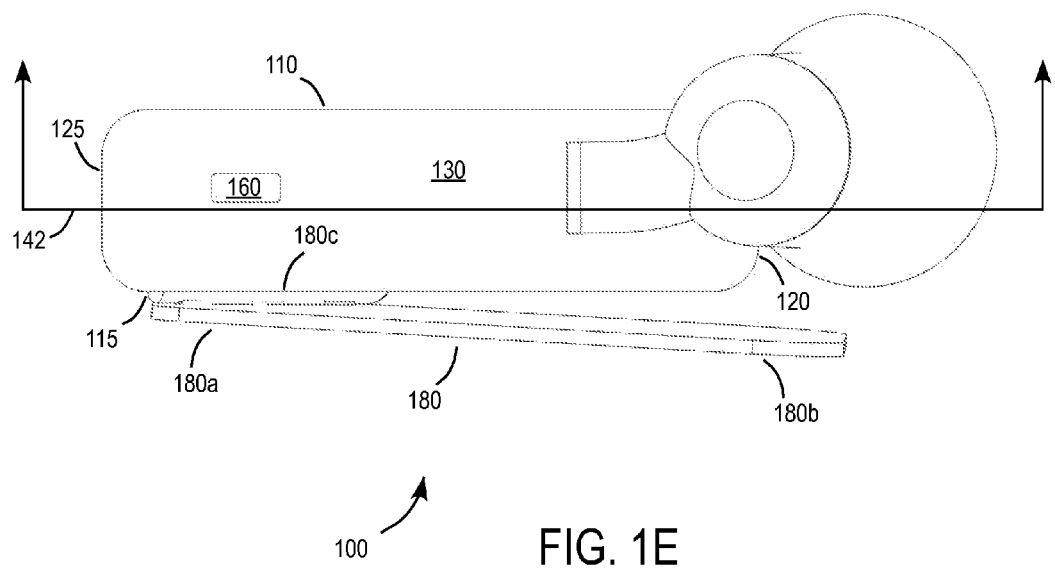
FIG. 1E is a simplified bottom view of the holder according to one embodiment.

FIG. 1A is a simplified front view of holder 100. FIG. 1B is a simplified right-side view of holder 100. FIG. 1C is a simplified left-side view of holder 100. FIG. 1D is a simplified top view of holder 100. FIG. 1E is a simplified bottom view of holder 100. According to one embodiment, holder 100 includes a body 105 where the body includes a front wall 110, a back wall 115, a right wall 120, a left wall 125, and a bottom wall 130 (collectively a set of walls). The walls may have a variety of thicknesses. For example, the thickness of the walls may be between about 2 millimeters thick and 3.5 millimeters thick, and according to a specific embodiment are about 3 millimeters thick. Front wall 110, back wall 115, right wall 120, left wall 125, and bottom wall 130 form an opening 135, where opening 135 opens towards a top 133 of holder 100. Top 133 is at an opposite end of holder 100 relative to bottom wall 130, which is at a bottom 134 of holder 100. The dimensions and sizing of holder 100 may be selected to accommodate various designs of mobile phone. Although disclosed embodiments are suitable for the iPhone™ mobile phone by Apple, Inc., it will be appreciated that other embodiments may be accommodate other mobile phone designs.

Front wall 110 may have an elongated opening 110a formed therein where the elongated opening extends from top 133 to a lower-mid portion 137 of front wall 110. Opening 110a may have a width, which is the approximate width of a display 102a of mobile phone 102. In a particular embodiment, for example, the width of opening 110a may be the approximate width of a display of an iPhone™ mobile phone. Front wall 110 may include an aperture 138 formed therein and positioned to substantially register with a button of mobile phone 102. For example, aperture 138 formed in front wall 110 may be a substantially round hole configured to register with a front-center button of an iPhone™ mobile phone. Aperture 138 may have a variety of sizes and locations to substantially match the front-center buttons of various mobile phone designs. In other embodiments, front wall 110 may include a set of apertures formed therein, where the set of apertures register with the buttons of other mobile phone types. For example, the set of apertures may include four apertures that register with the four control buttons on the front of an Android™ mobile phone. Those of skill in the art will understand that other walls of holder 100 may include a variety of other apertures that register with the buttons of other types of mobile phones. For example, right and left side walls 120 and 125 may include apertures that register with other buttons of a mobile phone, such a volume control button, or the like.

According to one embodiment, holder 100 includes a set of protrusions 140a, 140b, 140c, 140d, and 140e (collectively 140) for holding mobile phone 102 in opening 135 to inhibit the mobile phone from falling out of the holder while also accommodating mobile phones with a variety of different size protective cases. While holder 100 is described as including five protrusions 140a, 140b, 140c, 140d, and 140e, holder 100 may include more or fewer protrusions, and may include other structures for holding mobile phone 102 in opening 135. According to a specific embodiment, the protrusions 140a, 140b, and 140c are on back wall 115 and protrude from the back wall into opening 135 as shown in the top view of holder 100 in FIG. 1D. Protrusions 140a, 140b, and 140c may be configured to contact a back of mobile phone 102 to push a front of the mobile phone toward front wall 110 to hold the mobile phone in the holder. More specifically, protrusions 140a, 140b, and 140c may apply a spring force to the back of mobile phone 102 to push the front of the mobile phone toward front wall 110.

Figure 2A:
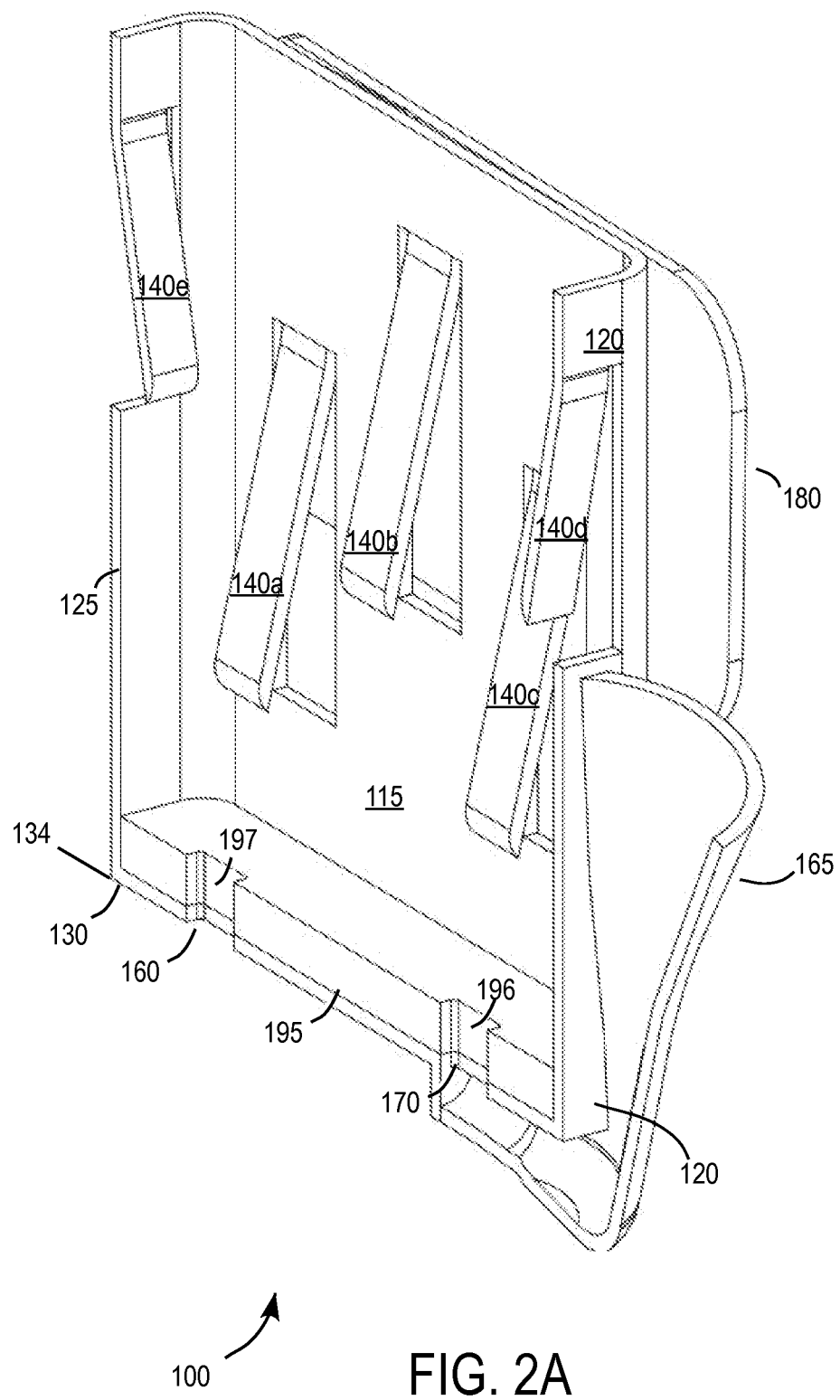
FIG. 2A is a perspective cut-away view of the holder without the front wall shown.

FIG. 2A is a perspective cut-away view of holder 100, which is shown without front wall 110. View line 142 in FIG. 1E shows the position of the cut-away for the perspective cut-away view of holder 100 in FIG. 2A. The cut-away view of holder 100 shown in FIG. 2A shows a front side of back wall 115 and shows the set of protrusions 140. Protrusions 140a, 140b, and 140c are shown protruding into opening 135. According to one embodiment, protrusions 140a, 140b, and 140c are springs, such as metal springs (e.g., spring steel), plastic springs, or the like. The protrusions 140a, 140b, and 140c may be cantilevered arms (e.g., cantilevered springs) integrally formed with back wall 115 as shown in the front view of back wall 115 in FIG. 2A.

According to one embodiment, opening 135 has a depth sufficient to receive a relatively thin mobile phone (e.g., about 5 mm (millimeters) to about 10 mm thick) or to receive a relatively thick mobile phone or a mobile phone with a case (e.g., about 10 mm to about 20 mm thick). The set of protrusions 140 may be configured to be pushed toward back wall 115 to accommodate mobile phones and mobile phones with cases having these various thicknesses according to one embodiment.

According to one embodiment, right protrusion 140d and a left protrusion 140e are configured to apply right and left spring forces to the sides of mobile phone 102 to keep the mobile phone centered in holder 100 and to further securely hold the mobile phone in opening 135. According to one embodiment, the right and left protrusions 140d and 140e are springs, such as metal springs (e.g., spring steel), plastic springs, or the like. Right and left protrusions 140d and 140e may be cantilevered arms (e.g., cantilevered springs) integrally formed with right wall 120 and left wall 125, respectively as shown in the right and left views of holder 100 in FIGS. 1C and 1D.

Figure 2B:
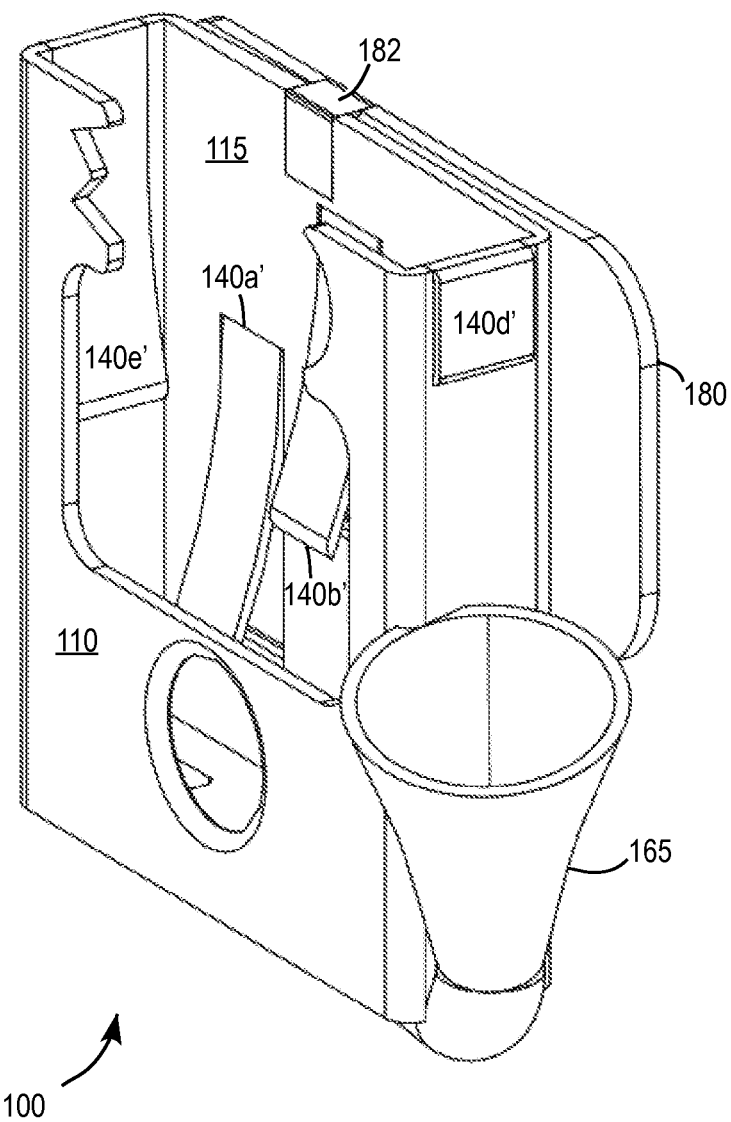
FIG. 2B is a perspective of a holder according to another embodiment.

FIG. 2B is a perspective view of a holder 220 according to an alternative embodiment. Holder 220 is substantially similar to holder 100, however holder 220 includes a set of protrusions 140a', 140b', 140c' (see FIG. 5), 140d', and 140e' (collectively 140'), which differ from the set of protrusion 140a, 140b, 140c, 140d, and 140e in that one or more of protrusions 140a', 140b', 140c', 140d', and 140e' are curved whereas 140a', 140b', 140c', 140d', and 140e' are relatively straight. Protrusions 140a', 140b', 140c', 140d', and 140e' are shown in FIG. 2B as having curved shapes that are concave. According to an alternative embodiment, protrusions 140a', 140b', 140c', 140d', and 140e' have curved shapes that are convex. One or more of protrusions 140a', 140b', 140c', 140d', and 140e' may be integrally formed with body 105 or may be separately formed and coupled to body 105. For example, protrusions 140*d* and 140*e* may be separately formed and coupled to body 105. Other differences between holder 220 and holder 100 are described below.

According to one embodiment, a first aperture 160 is formed in bottom wall 130. First aperture 160 may be positioned in bottom wall 130 to correspond with (approximately registered with) the first microphone of mobile phone 102, where the first microphone may be at the bottom of the mobile phone. First aperture 160 allows sounds to pass relatively unobstructed through bottom wall 130 to the first microphone. While first aperture 160 is shown as being formed in bottom wall 130, first aperture 160 may be formed on any of the walls of holder 100 so that the first aperture corresponds to the first microphone of a mobile phone.

According to a further embodiment, holder 100 includes an acoustic horn 165, which is configured to collect sound from mobile phone 102 and direct the sound upward from bottom 134 toward top 133. A second aperture 170 may be formed in bottom wall 130 wherein the second aperture corresponds to a location of a loudspeaker (e.g., a transducer) on a bottom of mobile phone 102. While second aperture 170 is shown as being formed in bottom wall 130, second aperture 170 may be formed on any of the walls of holder 100 so that the second aperture corresponds to the loudspeaker of a mobile phone if the loudspeaker is not on a bottom of the mobile phone. Second aperture 170 also corresponds to a first end 165*a* of acoustic horn 165 and provides a path for sound to travel relatively unobstructed from the loudspeaker of the mobile phone into the first end of the acoustic horn. Horn 165 may have a variety of sizes and angular orientations with respect to body 115. According to one embodiment, the set of protrusions 140 are configured to position mobile phone 102 in holder 100 to approximately register the mobile phone's first microphone with first aperture 160, and approximately register the mobile phone's loudspeaker with second aperture 170.

If holder 100 is located approximately at a user's chest or torso (e.g., on a seatbelt that is across a user's chest, on a lapel, on a placket, attached to a shirt pocket, etc.), acoustic horn 165 and an opening 175 of the acoustic horn from which sound is emitted may be generally directed toward a user's head. With acoustic horn 165 and/or opening 175 generally directed toward a user's head, sound emitted by the acoustic horn is focused toward the user's head for improved sound detection by the user.

Figure 3:
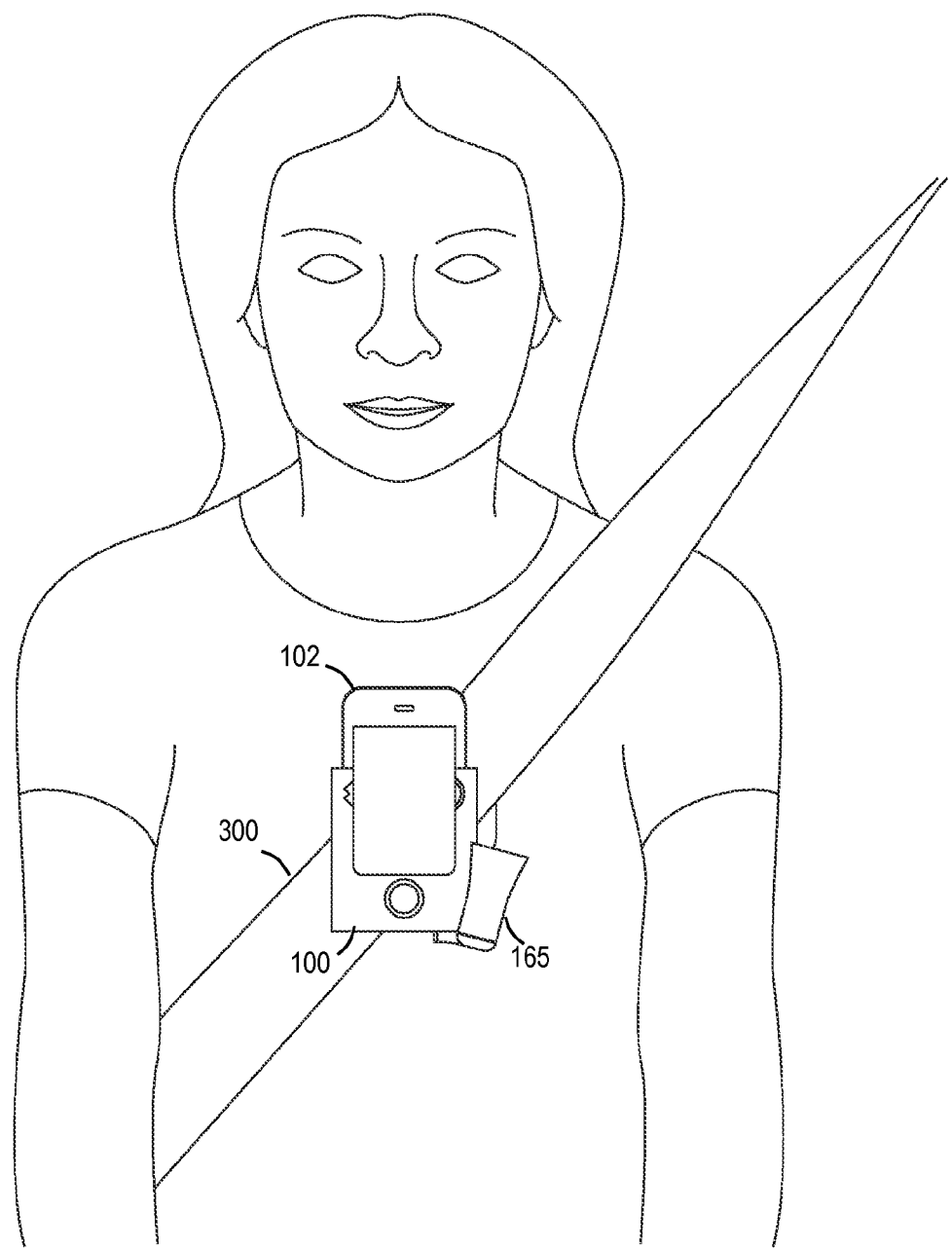
FIG. 3 is a simplified front view of the holder attached to a seatbelt, which is over a user's chest and torso.
Figure 4:
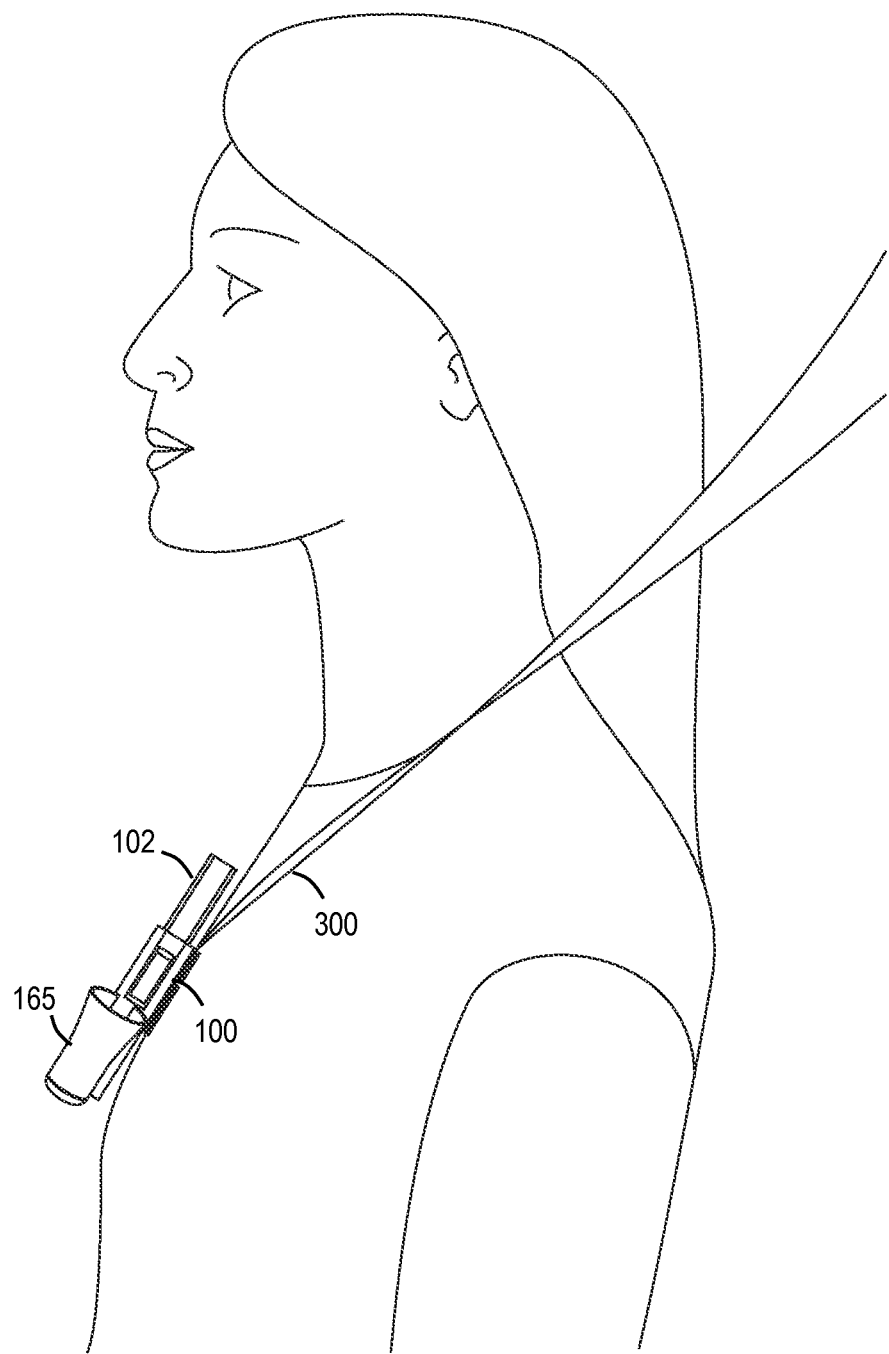
FIG. 4 is a simplified side view of the holder attached to the seatbelt.

FIG. 3 is a simplified front view of holder 100 attached to a seatbelt 300, which is over a user's chest and torso. Devices for attaching holder 100 to a seatbelt or other objects are described below. FIG. 4 is a simplified side view of holder 100 attached to seatbelt 300. As shown in FIGS. 3 and 4, with holder 100 positioned at a user's chest, horn 165 is generally directed up toward a user's head so that sound directed from the horn is focused toward the user's head for improved sound detection for sound emitted by mobile phone 102.

Acoustic horn 165 may be attached to body 105, and may be integrally formed with body 130. According to a specific embodiment, acoustic horn 165 is attached to front wall 110, right wall 120, and bottom wall 130, and may be integrally formed with front wall 110, right wall 120, and bottom wall 130. According to alternative embodiments, acoustic horn 165 is attached to additional or fewer portions of body 105. While the top view of holder 100 in FIG. 1D shows that right wall 120 forms a portion of acoustic horn 165 and provides one of the inner shapes of the acoustic horn, the acoustic horn may be formed such that the walls of body 105 do not provide any of the inner shapes of acoustic horn 165. The acoustic horn may have a variety of diameters to focus different wavelengths of sound. Further, while a primary-longitudinal axis 165*b* of the acoustic horn is shown to be angled away (not parallel) from holder 100, primary-longitudinal axis 165*b* may be substantially aligned (parallel) with body 105. That is, primary-longitudinal axis 165*b* may be substantially parallel with a substantially central axis of the holder passing from top 133 to bottom 134.

According to one embodiment, holder 100 may include a latch 180 for latching holder 100 to a seatbelt, a user's garments, or the like. According to one embodiment, latch 180 includes a back portion 180*a*, a front portion 180*b*, and a hinge 180*c*. Latch 180 may be coupled to back wall 115 via hinge 180*c*. Back portion 180*a* of latch 180 may be configured to be pressed to lift front portion 180*b* from the back wall (as shown in FIGS. 1D and 1E) for latching holder 100 to a seatbelt, a user's garments, or the like. Front portion 180*c* may include various surface shapes on a side of the front portion that faces the back wall to enhance a gripping force of the latch. As shown in FIGS. 3 and 4, latch 180 positions holder 100 and mobile phone 102 in a relatively upright position so that the horn is directed upward toward a user's head. Latch 180 may include various spring devices or the like to close the latch and hold the latch closed to attach the holder to a seatbelt, a user's garments, or the like. FIG. 2B depicts a spring clip 182 of latch 180 according to one embodiment. Spring clip 182 may provide a spring force for closing latch 180. Spring clip 182 may fit into a recess 184 (see FIG. 5) at the top of back wall 115.

According to one embodiment, latch 180 is relatively low profile so that holder 100 holds mobile phone 102 relatively close to the user's chest or torso. The user's chest or torso may act as a baffle for directing sound into the mobile phone's second microphone, which may be positioned near the top of the mobile phone.

Sound detected by the second microphone may be enhanced by the pressure of the sound waves being increased (e.g., doubled) by the user's chest or torso acting as a baffle to direct sound to the second microphone. If the microphone is sufficiently close to the user's chest or torso, the sound pressure may be doubled for sound frequencies of a human voice. For example, if the distance between the second microphone and the user's chest or torso is about 1.6 centimeters or less, the sound may be enhanced up to about 3.4 kHz. According to a further example, if the distance between the second microphone and the user's chest or torso is about 0.8 centimeters or less, the sound may be enhancement up to about 7 kHz. The pressure increase of sound at a surface is sometimes referred to as the "pressure zone effect". Enhancing the sound of user's speech as compared to the background noise in an automobile allows the second microphone to detect the user's speech despite the background noise. In contrast, if the microphone is sufficiently far away from the user's chest or torso, the sound that is reflected off of the user's chest or torso may interfere with the direct sound that travels directly to the second microphone. Interference of the sound that is reflected off of the user's chest or torso with the direct sound is sometimes referred to by acousticians as "comb filtering." According to one embodiment, latch 180 has a profile that provides for the second microphone to be within about 1.6 centimeters from a user's chest or torso.

According to one embodiment, holder 100 includes a gasket 195 (see FIG. 1D and FIG. 2) on bottom wall 130. Gasket 195 may have an opening 196 formed therein and surround aperture 170. Opening 196 may be substantially coextensive with aperture 170.

Gasket 195 may extend into opening 135 and may have a height such that the gasket is configured to contact the bottom of mobile phone 102 with the mobile phone positioned in holder 100. Gasket 195 may form a substantially acoustically-sealed path (i.e., a sound block) from the loudspeaker of the mobile phone to the first microphone of the mobile phone so that the sound from the loudspeaker is substantially directed from the loudspeaker through the acoustic horn and is substantially inhibited from traveling to the first microphone of the mobile phone. Gasket 195 inhibits the sound from the loudspeaker from interfering with sound (e.g., a user's speech) received by the first microphone. Reducing the interference between a user's speech and sound from the loudspeaker helps to limit the distortion of the sound from the user's speech detected by the first microphone. According to one embodiment, gasket 195 extends across bottom wall 130 (e.g., may be coextensive with bottom wall 130) and includes another opening 197 formed therein, where opening 197 may correspond to aperture 160. Further, opening 197 may be substantially coextensive with aperture 160. In some embodiments, gasket 195 may be a relatively soft material so that the gasket conforms to the shape of the bottom of mobile phone 102.

According to one embodiment, holder 100 includes a set of finger guides 210a, 210b, and 210c (collectively 210). A finger guide is a physical feature on holder 100 that may be felt by a user to tactilely guide a user to touch a specific portion of mobile phone 102 with the mobile phone disposed in the holder. The finger guides may be configured to tactilely guide a user to a hard button or a soft button on the mobile phone. A hard button is a traditional button, such as a mechanical button, an electromechanical button, or the like. A soft button is a button displayed on a touch screen and may be activated by touch. Finger guide 210a may be a call-answer finger guide. Finger guide 210a may include the top portion of rounded corner 110b in front wall 110. Finger guide 210a may also include the top portion of rounded corner 110b and a straight portion 110c of front wall 110 above the top portion of rounded corner 110b. Finger guide 210a may be adjacent to the slide-to-unlock button (a type of screen button) displayed on a mobile phone (such as an iPhone™, an Android™ phone, etc.) to tactilely guide a user to touch the slide-to-unlock button for unlocking the mobile phone to answer a call. A slide-to-unlock button, as is well known in the art, is an icon that is typically swiped with a finger to answer a call on a mobile phone where the initial lock screen is displayed after the mobile phone receives a call.

Finger guide 210b may be a speakerphone finger guide and may be configured to be adjacent to a speakerphone button of mobile phone 102. Finger guide 210b is shown in FIG. 1A as a rounded indentation in the front wall, but may have a variety of alternative shapes. The set of finger guides provides for answering up calls using the sense of touch, without having to look at the mobile phone. For example, to answer a call, a user may: i) feel for the first finger guide to locate the slide-to-unlock button; ii) swipe the slide-to-unlock to unlock the mobile phone and answer the call; iii) feel for the second finger guide for turning on the speaker phone option; and iv) thereafter press a speaker phone button for placing the mobile phone in speaker phone mode. For some types of mobile phone, the set of finger guides further provide for placing calls without looking at the mobile phone. Suppose, for example, the mobile phone has speech recognition for placing call. A user may using touch may search for the first finger guide for unlocking the phone, swipe the slide-to-unlock button indicated by the first finger guide, and thereafter speak call information for placing a call. Once the call is placed, the user may use touch to search for the second finger guide for turning on the speaker phone option, and thereafter press a speaker phone button for placing the mobile phone in speaker phone mode.

Finger guide 210c may be a mute-button finger guide and may be configured to be adjacent to a mute button of mobile phone 102. In some embodiments, finger guide 210c may be shaped with a triangular point on the front wall. The triangular point provides a mildly sharp feel to associate a negative cognitive mental operation for placing the mobile phone is mute mode where mobile phone's microphones are turned off. It will be appreciated that shapes other than triangular may be used. While the set of finger guides 210 is described herein as including three finger guides 210a, 210b, 210c, the set of finger guides may include fewer or more guides, such as finger guides for volume control buttons or the like.

Figure 5:
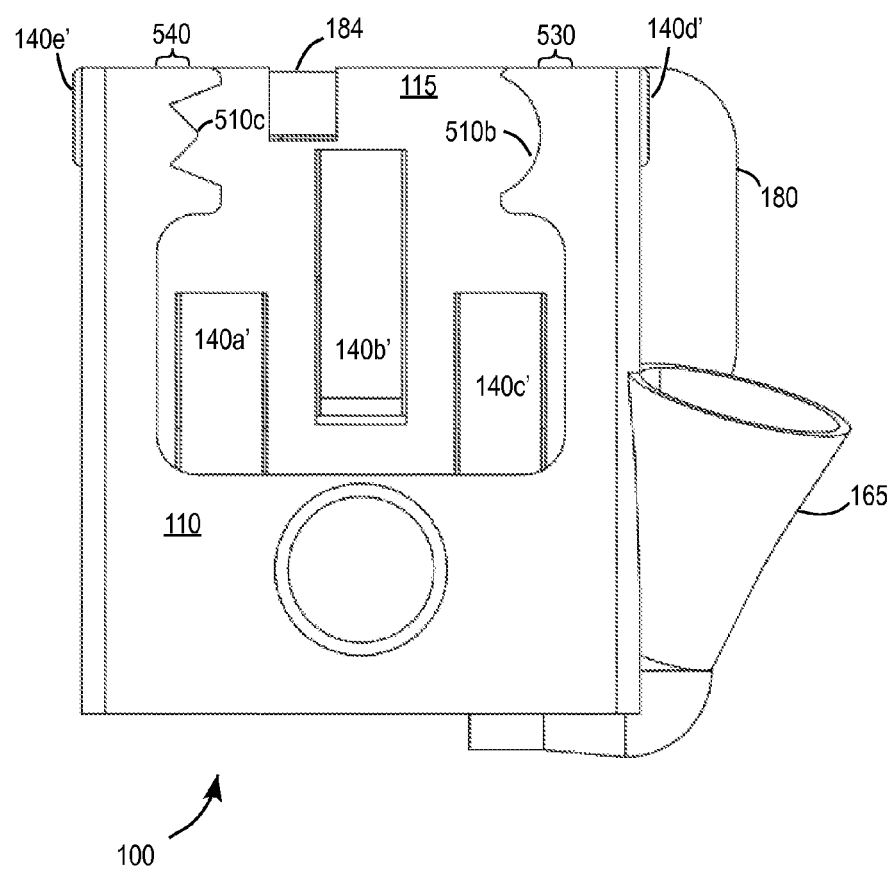
FIG. 5 is a simplified front view of the holder according to another embodiment.

FIG. 5 is a simplified front view of holder 220, which is briefly described above. Holder 220 includes a finger guide 510b and a finger guide 510c. Finger guide 510b is similar to finger guide 210b (see FIG. 1A) in that finger guide 510b and 210b have a rounded portion to tactilely guide a user to touch a specific portion of a mobile phone, but finger guide 510b differs from finger guide 210b in that finger guide 510b includes a lateral section 530, which laterally extends the rounded portion of finger guide 510b into opening 110a. More specifically, lateral section 530 may position the rounded portion of finger guide 510b relatively close to a soft button (e.g., a speakerphone button of mobile phone 102), which may not be relatively close to a side of display 102a of mobile phone 102.

Finger guide 510c is similar to finger guide 210c (see FIG. 1A) in that finger guide 510c and 210c have a triangular point to tactilely guide a user to touch another specific portion of a mobile phone, but finger guide 510c differs from finger guide 210c in that finger guide 510c includes a lateral section 540, which laterally extends the triangular point of finger guide 510c into opening 110a. More specifically, lateral section 540 may position the triangular point of finger guide 510c relatively close to a soft button (e.g., a mute button of mobile phone 102), which may not be relatively close to a side of display 102a of mobile phone 102. While holder 220 is described as including curved protrusion and finger guides with lateral section, holder 100 may include various elements of holder 220, such as finger guides with lateral section or curved protrusions.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A holder for a mobile phone comprising:
   a body having an opening to receive the mobile phone and having a bottom;
   a latch coupled to the body for holding the holder with the opening up; and
   one or more tactile guides on the body of the holder to tactilely guide a user's touch to corresponding one or more soft buttons displayed on a touchscreen of the mobile phone, the tactile guides comprising physical features that are positioned on the body of the holder to align with the soft buttons, wherein a user of the holder can locate a soft button by touching a corresponding tactile guide and make a gesture on the soft button to activate a function of the mobile device that is associated with the soft button, an acoustic horn coupled to the body and having a sound receiving end and a sound emitting end, wherein the sound receiving end is configured to be adjacent to a transducer of the mobile phone, and the sound emitting end is configured to direct sound in an upward direction.

2. The holder of claim 1, wherein the sound emitting end is configured to direct sound up toward a user's head with the latch holding the opening up.

3. The holder of claim 1, wherein the latch is configured to latch the holder to an automobile seatbelt to hold the opening up and the sound emitting end up.

4. The holder of claim 3, wherein the latch is configured to latch the holder to a garment of a user to hold the holder with the opening up and the sound emitting end up.

5. The holder of claim 3, wherein the latch is configured to latch the holder at a user's chest or torso, and the acoustic horn is configured to direct sound toward a user's head.

6. The holder of claim 1, wherein a bottom of the body has an aperture formed therein for receiving sound from the transducer of the mobile phone and directing the sound to the acoustic horn for transmission from the acoustic horn.

7. The holder of claim 6, further comprising a gasket coupled to the bottom of the body, wherein the gasket has a central opening at the aperture to allow sound from the transducer to pass to the acoustic horn and inhibit sound passing through a material that forms the gasket.

8. The holder of claim 6, wherein:
the bottom of the body has a second aperture formed therein,
the second aperture is configured to be adjacent to a microphone of the mobile phone, and
gasket is configured to inhibit sound from traveling from the transducer of the mobile phone to the microphone of the mobile phone.

9. The holder of claim 1, wherein at least one tactile guide in the set of tactile guides includes a lateral extension to laterally extend the tactile guide.

10. The holder of claim 9, wherein:
the set of tactile guides includes a first tactile guide adjacent to an unlock button soft button included in the set of buttons, and
the set of tactile guides includes a second tactile guide adjacent to a speaker phone button included in the set of buttons.

11. The holder of claim 10, wherein the first and the second tactile guides are recesses formed in the body.

12. The holder of claim 9, wherein the set of tactile guides includes a third tactile guide adjacent to a mute soft button of the mobile phone.

13. The holder of claim 12, wherein the third tactile guide is a protrusion extending from the body.

14. A holder for a mobile phone comprising:
a body forming an opening, and
having a bottom forming a bottom of the opening, wherein the opening is configured to receive and hold the mobile phone in the opening, wherein the body includes a set of tactile guides to tactilely guide a user's touch to a set of soft buttons displayed on a display of the mobile phone, the tactile guides comprising physical features that are positioned on the body of the holder to align with the soft buttons, wherein a user of the holder can locate a soft button by touching a corresponding tactile guide and make a gesture on the soft button to activate a function of the mobile phone that is associated with the soft button; and
a latch coupled to the body for holding the holder with the opening up.

15. The holder of claim 14, wherein:
the set of tactile guides includes a first tactile guide adjacent to an unlock button soft button included in the set of buttons, and
the set of tactile guides includes a second tactile guide adjacent to a speaker phone button included in the set of buttons.

16. The holder of claim 15, wherein the first and the second tactile guides are recesses formed in the body.

17. The holder of claim 14, wherein the set of tactile guides includes a third tactile guide adjacent to a mute button of the mobile phone.

18. The holder of claim 17, wherein the third tactile guide is a protrusion extending from the body.

19. The holder of claim 14, further comprising an acoustic horn coupled to the body and having a sound receiving end and a sound emitting end, wherein the sound receiving end is configured to be adjacent to a transducer of the mobile phone, and the sound emitting end is configured to direct sound upward.

20. The holder of claim 14, wherein at least one tactile guide in the set of tactile guides includes a lateral extension to laterally extend the at least one tactile guide.

21. The holder of claim 1 further comprising one or more flexible protrusions extending from the body into an interior of the body to urge the mobile phone toward the one or more tactile guides.

* * * * *